Patented July 28, 1925.

1,547,252

UNITED STATES PATENT OFFICE.

PAUL W. KUNZE, OF DRESDEN, GERMANY.

PROCESS FOR PRODUCING AN AGGLUTINANT FOR MAKING COMBUSTIBLE BRIQUETTES.

No Drawing.    Application filed January 22, 1924.   Serial No. 687,792.

*To all whom it may concern:*

Be it known that I, PAUL W. KUNZE, a citizen of the Empire of Germany, and residing at Dresden, Germany, have invented certain new and useful Improvements in Processes for Producing an Agglutinant for Making Combustible Briquettes, of which the following is a specification.

This invention relates to the manufacture of briquettes, more especially to the production of an agglutinant for making briquettes from "acid resins" or from residues of certain industries which substantially consist of acid resins.

Acid resins are intricate mixtures of resinous condensation products of tar and mineral oil constituents, hydrocarbons, phenols, etc., impregnated with sulfuric acid. Such mixtures are obtained as residues in the process of refining tar and mineral oil distillates by means of sulfuric acid.

I have found that the agglutinant power of the raw "acid resins" is not yet sufficient for making combustible briquettes. Moreover the acid present would act deleteriously on the presses, heating devices, etc. It has already been proposed to employ acid resins in combination with naphthalene (that is itself used as an agglutinant) for briquetting sawdust. Now I have found that the acid resins alone may be used as agglutinants after having been treated in the following manner.

According to my invention the acid resins or the residues containing them are melted together with an alkaline substance, preferably finely ground caustic lime, and then the molten mass is treated with air. Hereby a resinification of certain components for instance unsaturated hydrocarbons takes place and some volatile matter which may have remained will be expelled whereby the hardness and the agglutinant power of the product will be increased.

The final product forms a black, pitchlike mass showing a coarse-conchoidal fracture and a faint gloss. Its softening point is the higher the farther the treatment with air was continued; at 100° centigrade it may be easily cast and formed to blocks. A determined melting point cannot be given as on heating the mass beyond its softening point it will be decomposed.

It will not be necessary to remove the whole of the acid present when the product is applied to the briquetting of recent fossils (peat) or fresh combustibles such as sawdust, straw, reed and the like, as the remaining part of the acid will aid to split up the vegetable fibres and the pliancy of the mass is increased thereby.

It has already been proposed to treat hydrocarbons such as petroleum residues, tar and the like with oxidizing agents such as ozone or peroxide of chlorine to render the same saponifiable and then to saponify the same with alkalies or alkaline earths in order to obtain an agglutinant for making briquettes. From these known processes the process according to my invention differs in that I am able to employ materials which do not necessitate a treatment with such expensive substances as ozone or peroxide of chlorine, but which are transformed only by means of common atmospheric air to substances having a sufficient agglutinant power for the purpose in question.

Example: 100 parts by weight of fluid or semifluid "acid resin" are melted together with 2 to 10 parts by weight of ground caustic lime, the proportion of the latter depending on the degree of acidity of the resin employed. The mixture is heated during several hours to a temperature of 200 to 250° centigrade and during that time a current of air is passed through the heated mass until a sample shows the desired degree of hardness of the final product.

Having now particularly described and ascertained the nature of my invention, what I claim is:—

Process for producing an agglutinant for making combustible briquettes consisting in adding caustic lime to acid resin, heating the mass to a temperature of 200 to 250° centigrade during several hours and treating the mass with air during that time.

In testimony whereof I affix my signature in presence of two witnesses.

PAUL W. KUNZE.

Witnesses:
   JOHANNES T. DRINKER,
   N. CROCKER.